Dec. 5, 1933.  L. M. CORRELL  1,937,945
INDUCTION ELECTRIC PIPE WELDING
Filed Oct. 20, 1932  2 Sheets-Sheet 1
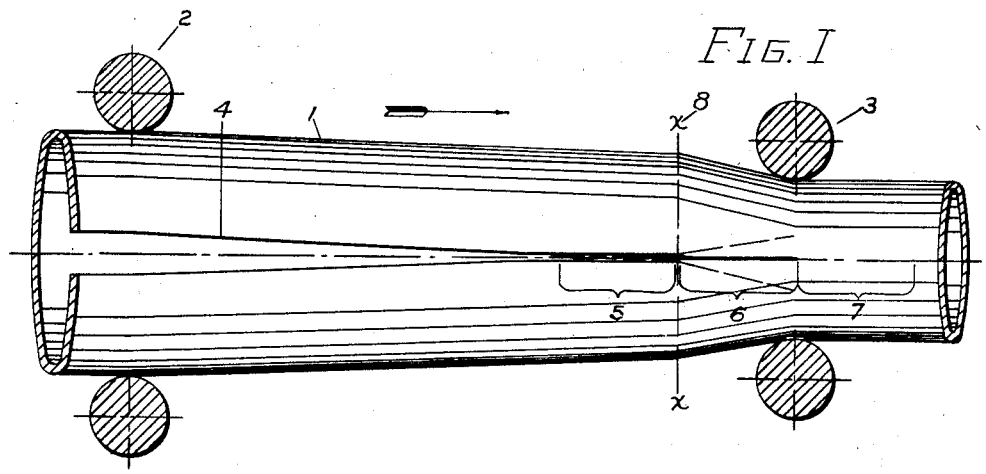
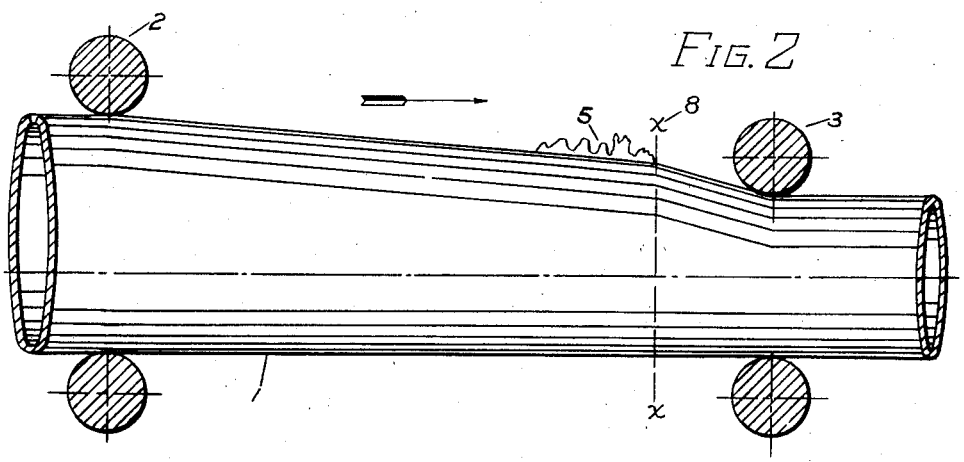
INVENTOR.
Landoff M. Correll Dec. 5, 1933.   L. M. CORRELL   1,937,945
INDUCTION ELECTRIC PIPE WELDING
Filed Oct. 20, 1932   2 Sheets-Sheet 2
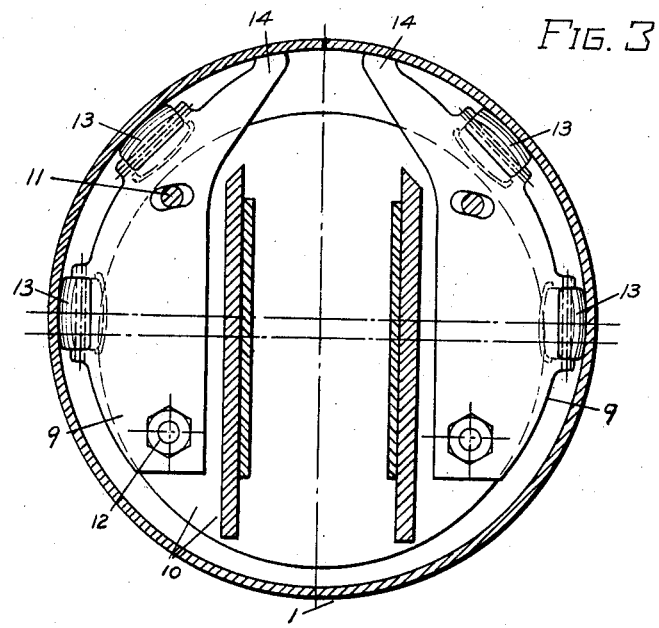
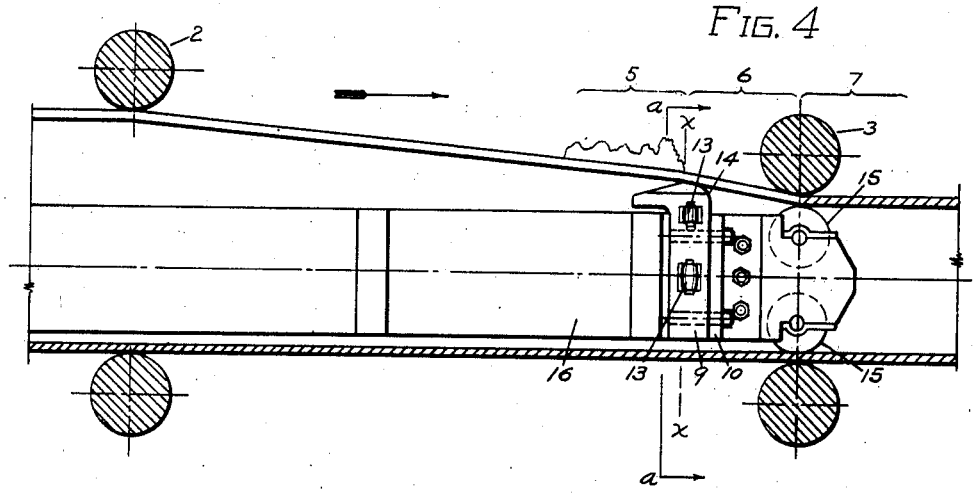
INVENTOR.
Landorff M. Correll

Patented Dec. 5, 1933

1,937,945

UNITED STATES PATENT OFFICE 1,937,945

INDUCTION ELECTRIC PIPE WELDING

Landorff M. Correll, Youngstown, Ohio

Application October 20, 1932. Serial No. 638,659

12 Claims. (Cl. 219—10)

My invention relates to the manufacture of pipes from a strip of sheet metal and induction electric butt welding the seam thereof to make what is known as electrically welded seamless tubing and has for its general purpose to provide improvement in the art of electric welding of the longitudinal seam. More specifically, it relates to a method and apparatus for predetermining the convergence of the tube during the continuous passing of the tube through an electric welding machine, wherein the apparatus is located inside of the preformed open seam tube.

In the present practice of making induction electrically welded tubes, the open seam tube is passed through an electric flashing and heating zone which brings the edges of the tube up to welding temperature and then through compressing rolls which bring the edges together with sufficient pressure to complete the weld, the tube emerging from the compressing rolls as a continuously welded pipe. Certain sizes of open seam tube enter the welding machine with a gap between the edges of one or two inches width. The circumference of the tube is larger at the entering rolls than the circumference at the compressing rolls so that the length of tube between these rolls converges in a somewhat funnel shape. The side of the tube opposite the open side remains in nearly a straight line while the converging is practically confined to the remainder with a maximum of the convergence on the gap side of the tube. This applies whether the tube is put through a welding machine with the gap either on the top or bottom side. This produces a V-shaped gap in the open seam up to where the flashing commences and such gap would tend to persist in the same form up to the compression rolls in tube welders.

However, during the flashing period, the adjacent edges are burned off as rapidly as they are brought together and a narrow gap of approximately one-thirty second of an inch, depending on the applied voltage, then extends from the start of the flashing and through the flashing zone. The flashing and burning off persists to within six or eight inches of the compressing rolls and from there on, the edges approach or come in contact with each other as they proceed toward the compressing rolls.

The convergence angle of the tube edges which are being brought together in the funnel shaped section determine the length of flashing and burning off section and as this exists almost to the compressing rolls and as they have been freely burned off there is little heated metal left for the compression. Therefore the welding is accomplished on a very narrow margin, with pinholes and unwelded sections often produced. This constitutes the art of induction electric welding as it is now known and practiced.

I have discovered that the proportion of the amount of metal that can be burned off and the amount reserved for the final compression can be controlled by means of forming a bulge circumferentially in the tube after the flashing section and located from two inches to twelve inches in advance of the compressing rolls, the location being determined by the size of the tube and construction of the mechanism inside the tube.

The effect of the bulge on the V-gap is to develop a less abrupt convergence up to and through the flashing zone then followed by a rapid convergence at the end of the flashing up to the compressing rolls. The edges of the tube are withheld from an over amount of flashing and burning off and the final abrupt convergence gathers the edges for sufficient squeeze in the compression rolls.

The object of my invention is the provision and an internal adjustably expanding mandrel as a means for producing this bulge circumferentially with the tube and is not to be confused with internal rolls or other means now employed in the electric welding of tubing which are used to extend or align the edges of the tube. The novelty of my invention will be pointed out in the appended claims.

The drawings which accompany the specifications illustrate the position of the edges and the general shape of the tube during the passage through the welding machine and also the internal mandrel device.

In the drawings:

Figure 1 is a plan view and shows the tube in a position in the welder with the bulge plainly visible in the desired location.

Fig. 2 shows a side elevation of the tube shown in Fig. 1;

Fig. 3 is an enlarged view showing an end section of tube taken on line a—a of Fig. 4 and an internal expanding mandrel, and Fig. 4 is a side elevation in section and shows a portion of the welding machine, the tube in section, the internal induction coil, the internal welding rolls, as well as the internal tube expanding device.

Referring now to the drawings, Figs. 1 and 2 show a length of tube 1 located in the electric welding machine between the entering rolls 2 and compressing rolls 3. The gap 4 between the edges of the tube, is converging toward the flashing section 5, followed by the closing section 6 and the welded section 7. The bulge 8 produced in the tube is on line XX. The progressive direction of the tube is indicated by the arrow. To avoid confusion the internal mechanism is not shown in Figs. 1 and 2.

Fig. 3 shows the tube in cross section, the adjustably expanding mandrel 9 mounted on frame 10 by means of cap screws 11 and 12. Contact is made with interior of the tube by rollers 13 and shoes 14 which force the tube to bulge outwardly.

Fig. 4 is a longitudinal section through the tube 1 and partially shows the internal mechanism of the welding machine. The entering rolls 2 and compressing rolls 3 are in their respective locations as well as the internal welding rolls 15 mounted on frame 10. The expanding mandrel 9, comprises revolvably mounted rollers 13 and shoes 14 and is adjustably attached to frame 10 so that the amount of circumferential bulge can be varied to suit the welding conditions. The flashing section 5 is over the induction coil 16 and the closing section 6 extends from shoe 14 to compression roll 3 followed by the welded section 7 of the pipe.

I am aware that numerous details of construction may be varied through a wide range without departing from the principles of my invention as defined in the appended claims, and I therefore do not propose limiting the patent granted otherwise than necessitated by the prior art.

I claim:

1. The method of electrically welding a tube which comprises progressively inductively heating spaced opposed edge zones of the tube, compressing opposed heated edges into contact, and bulging the tube at a point between the heating and compressing zones.

2. The method of electrically welding a tube which comprises feeding an open seam tube with opposed seam edges spaced to a V form, compressing the tube to force opposed seam edges into contact, inductively heating opposed seam edges progressively in advance of the compressing point and bulging the tube between the heating and compressing zones.

3. The method of electrically welding a tube which comprises feeding a preformed cylindrical tube through a welding device with the opposed edges of the tube converging, inductively heating opposed edge zones of the tube, compressing opposed heated edges into contact, and bulging the tube between the heating zone and the compressing zone to reduce the seam edge convergence and maintain opposed edges spaced in the heating zone.

4. The method of electrically welding a tube which comprises feeding an open seam tube through rolls, compressing the tube to force opposed seam edges into contact, inductively heating opposed seam edges progressively, expanding the tube transversely in advance of the compression zone to maintain seam edges substantially parallel and spaced throughout the heating zone, and establish an abrupt convergence between the heating zone and the compressing zone.

5. The method of electrically welding a tube which comprises feeding an open seam tube with opposed edges spaced to a V form, inductively heating opposed seam edges along a zone, compressing the tube to force heated edges into contact, and spreading the tube between the heating zone and the compressing zone to maintain opposed edges substantially parallel and spaced throughout the heating zone.

6. In an apparatus for welding tubes, an inductive heating means, means for feeding a preformed tube relatively to said heating means in position to heat opposed seam edges, means for compressing opposed heated seam edges into contact, and means for maintaining a circumferential bulge in said tube at a point between the heating means and the compressing means to maintain opposed edges spaced in the heating zone.

7. In an apparatus for electrically welding tubes, tube feeding means, tube compressing means, inductive heating means positioned between said feeding and compressing means, and means for producing a circumferential expansion transversely of a tube that is being fed to the apparatus at a point intermediate the heating and compressing means.

8. In an apparatus for electrically welding tubes, means for feeding an open seam tube to the apparatus, means positioned within the tube for inductively heating a linear zone along opposed edges, means for compressing heated seam edges, and means for maintaining a bulge in the tube between the heating and compressing means to maintain tube edges spaced along the heating zone.

9. In an apparatus as set forth in claim 8, the means for bulging the tube comprising an expanding mandrel positioned to come within a tube being fed and displaced from the heating zone.

10. In an apparatus for electrically welding tubes, means for feeding an open seam tube to the apparatus with the open seam edges converging, means positioned within the tube for inductively heating a linear zone along opposed edges, means for compressing heated edges into contact, and means positioned within the tube and between the heating zone and the compressing means to establish a reduced divergence between the seam edges between the heating zone and the compressing zone.

11. In a tube welding apparatus, means for feeding a partially formed tube with opposed open seam edges thereof converging, means to compress opposed edges into contact, and means for bulging said tube between the feeding and compressing means to provide opposed edge zones on opposite sides of the bulging means, the leading edge zone converging less abruptly than the following edge zone.

12. In a welding unit, tube feeding means, tube edge compressing means, means intermediate said feeding and compressing means for inductively heating opposed tube edge zones, a mandrel in position to be received within the tube, and means on said mandrel positioned between the heating means and the compressing means for spreading said tube transversely to maintain tube edges spaced along the heating zone.

LANDORFF M. CORRELL.